US008328905B2

(12) United States Patent
Matsuzaki et al.

(10) Patent No.: US 8,328,905 B2
(45) Date of Patent: Dec. 11, 2012

(54) AIR CLEANER ASSEMBLY AND METHOD

(75) Inventors: Kenji Matsuzaki, Osaka (JP); Hitoshi Takeuchi, Nara (JP); Toshikazu Mochizuki, Osaka (JP)

(73) Assignee: Hakko Corporation, Osaka (JP)

( * ) Notice: Subject to any disclaimer, the term of this patent is extended or adjusted under 35 U.S.C. 154(b) by 112 days.

(21) Appl. No.: 13/029,334

(22) Filed: Feb. 17, 2011

(65) Prior Publication Data

US 2011/0197761 A1 Aug. 18, 2011

Related U.S. Application Data

(60) Provisional application No. 61/305,853, filed on Feb. 18, 2010.

(51) Int. Cl.
*B01D 46/46* (2006.01)

(52) U.S. Cl. ........... 95/25; 55/471; 55/482; 55/DIG. 34; 95/26; 96/417; 96/424

(58) Field of Classification Search ................. 55/385.2, 55/472, 473, DIG. 34; 95/1, 4, 10, 22, 25; 96/417–422, 424; 116/DIG. 25
See application file for complete search history.

(56) References Cited

U.S. PATENT DOCUMENTS

| | | | |
|---|---|---|---|
| 3,936,284 A | 2/1976 | Mason | |
| 5,428,964 A * | 7/1995 | Lobdell | 62/176.6 |
| 5,810,908 A * | 9/1998 | Gray et al. | 95/25 |
| 6,036,757 A | 3/2000 | Gatchell et al. | |
| 6,423,118 B1 * | 7/2002 | Becerra et al. | 95/19 |
| 6,448,896 B1 | 9/2002 | Bankus et al. | |
| 6,494,940 B1 | 12/2002 | Hak | |
| 6,660,070 B2 * | 12/2003 | Chung et al. | 96/424 |
| 6,736,133 B2 | 5/2004 | Bachinski et al. | |
| 6,790,257 B2 * | 9/2004 | Jeng et al. | 95/19 |
| 7,261,762 B2 * | 8/2007 | Kang et al. | 95/1 |
| 7,875,099 B2 * | 1/2011 | Abraham et al. | 95/4 |
| 2003/0070544 A1 * | 4/2003 | Mulvaney et al. | 95/25 |
| 2007/0012181 A1 | 1/2007 | Niezgoda | |
| 2007/0039472 A1 | 2/2007 | Bias et al. | |
| 2007/0277672 A1 | 12/2007 | Johansson | |

FOREIGN PATENT DOCUMENTS

| | | |
|---|---|---|
| DE | 20017210 U1 | 3/2001 |
| JP | 2755200 | 9/1996 |
| WO | WO 97/47928 A2 | 12/1997 |
| WO | WO 02/26349 A1 | 4/2002 |

* cited by examiner

*Primary Examiner* — Duane Smith
*Assistant Examiner* — Minh-Chau Pham
(74) *Attorney, Agent, or Firm* — Squire Sanders (US) LLP

(57) ABSTRACT

An air filter assembly has a fan, pre-filter, a main filter, and a control circuit which generates various signals to the user as to when the pre-filter and the main filter should be replaced. The control circuit detects when the pre-filter should be replaced from two conditions: a first pre-filter replacement condition based decreased air flow, and a second pre-filter replacement condition based on cumulative operating time. The control circuit detects when the main filter should be replaced based on a formula containing a number of the occurrences of the first pre-filter replacement condition and a number of occurrences of the second pre-filter replacement condition. The control circuit also detects a main filter replacement condition based on cumulative operating time of main filter. The main filter can have a fuse that is blown when the main filter should be replaced.

20 Claims, 12 Drawing Sheets

AIR CLEANER ASSEMBLY AND METHOD

CROSS-REFERENCE TO RELATED APPLICATIONS

This application claims the benefit of U.S. Provisional Application No. 61/305,853, filed Feb. 18, 2010, which is incorporated herein by reference.

FIELD OF THE INVENTION

This invention relates generally to an air cleaner and, more particularly, to replacement of an air filter in an air cleaner.

BACKGROUND

Various air cleaners suction air through multiple filters. Some of them provide an alert signal for replacing the filters based solely on a predetermined time interval which has elapsed. The alert signal occurs regardless of whether the filters are actually clogged or degraded. This is because filters will clog at varying times depending on the amount of airborne particulates in the room. Other air cleaners with multiple filters use a device comprising a pressure gauge downstream of the filters which floats an indicator element to signal the need for replacement. However such a device fails to provide information as which filter should be replaced. It is possible that only one of the filters actually needs to be replaced. Accordingly, there is a need for an air cleaner and method which accounts for varying environmental conditions and which alerts the user as to when each one of the filters needs to be replaced.

SUMMARY OF THE INVENTION

Briefly and in general terms, the present invention is directed to an air cleaner assembly and a method of operating an air cleaner assembly.

In aspects of the present invention, an air cleaner assembly comprises a housing, a fan configured to draw air into the housing when the fan is operated, a pre-filter in the housing and configured to trap particles in the air drawn into the housing, a main filter in the housing and disposed downstream of the pre-filter, a display comprising an indicator, and a control circuit configured to control the indicator to indicate that the pre-filter should be replaced and to indicate the main filter should be replaced, individually.

In aspects of the present invention, a method of operating an air cleaner assembly having a pre-filter and a main filter, comprises generating a main filter replacement signal, from the air cleaner to the user of the air cleaner, when $Z=(N+(C \times M))$ exceeds a limit value corresponding to an end of useful life of the main filter, wherein N is a multiple number of occurrences of when clogging of the pre-filter is detected, M is a multiple number of occurrences that a cumulative operating time exceeds a pre-filter operating time limit corresponding to an end of useful life of the pre-filter, and C is a correction factor stored in the air cleaner.

In further aspects, the pre-filter has a first absorption capacity and a first useful life, the main filter has a second absorption and a second useful life, the second absorption capacity is greater than the first absorption capacity, the second useful life is greater than the first useful life, and the main filter is located downstream of the pre-filter.

The features and advantages of the invention will be more readily understood from the following detailed description which should be read in conjunction with the accompanying drawings.

DETAILED DESCRIPTION OF THE INVENTION

Figure 1:
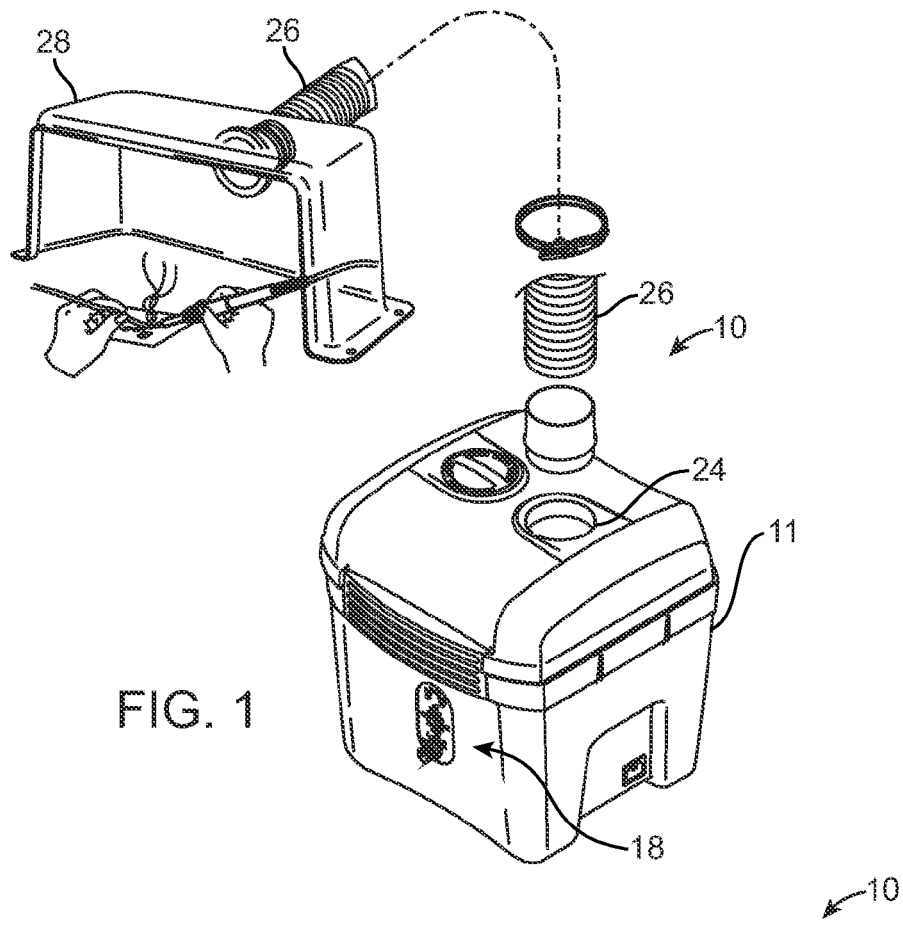
FIG. 1 is a perspective view showing the top and front of an air cleaner assembly connected by a suction duct to a hood for collecting fumes and airborne particles.
Figure 2:
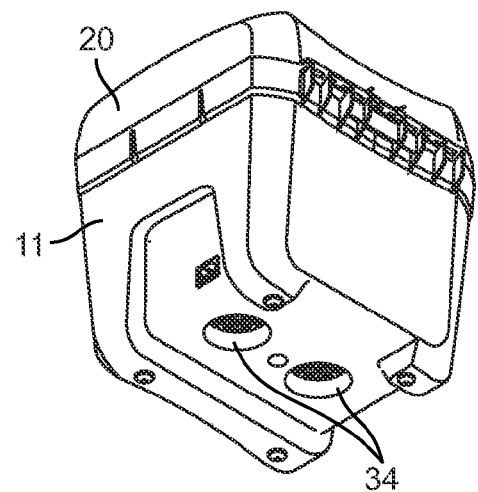
FIG. 2 is a perspective view showing the bottom and rear of the air cleaner assembly of FIG. 1.
Figure 3:
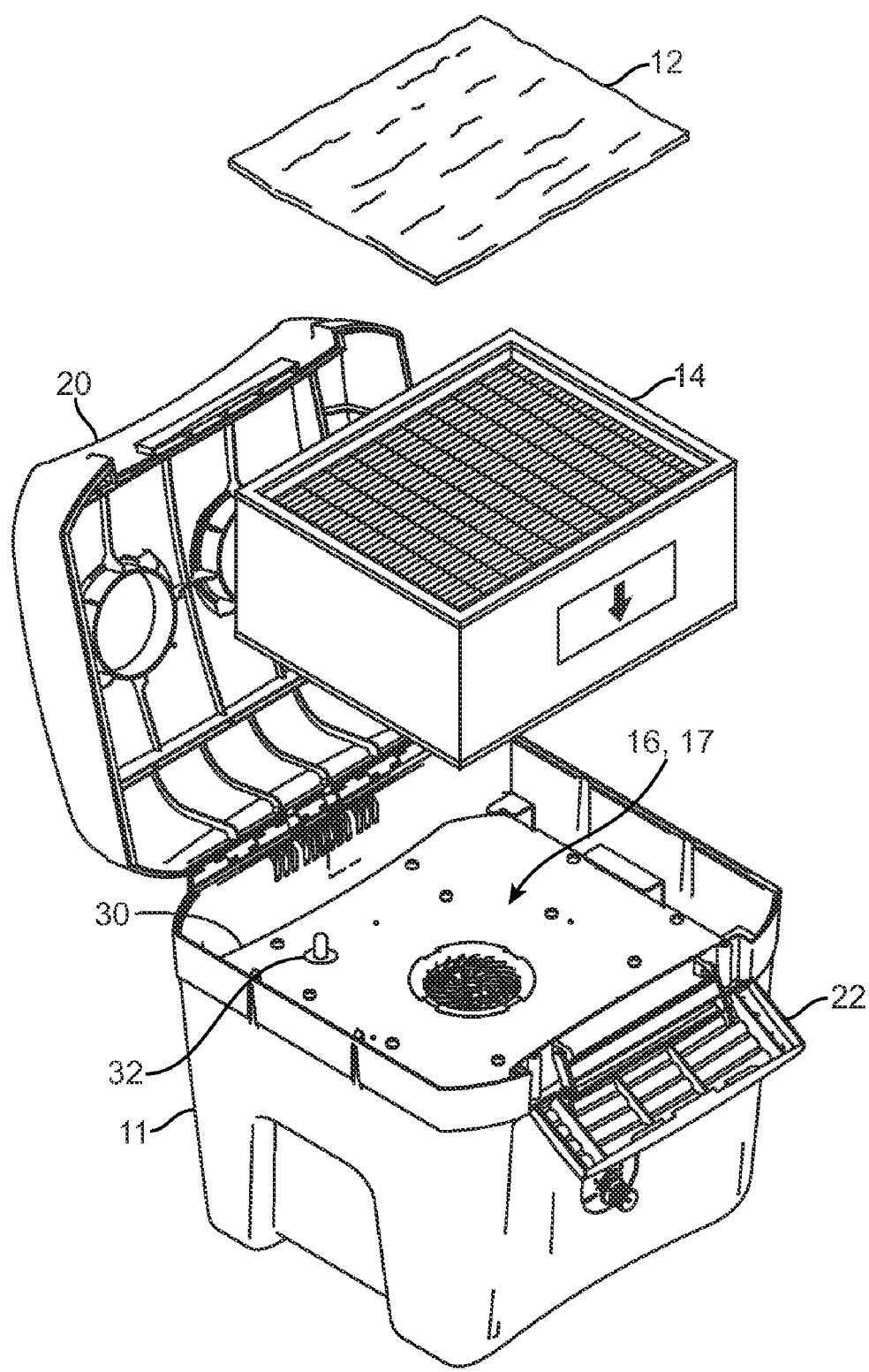
FIG. 3 is a perspective view of the air cleaner of FIG. 1, showing a lid opened to allow removal of a pre-filter and a main filter which are normally contained beneath the lid.

Referring now in more detail to the exemplary drawings for purposes of illustrating embodiments of the invention, wherein like reference numerals designate corresponding or like elements among the several views, there is shown in FIGS. 1-3 an air cleaner assembly 10 for extracting fumes from soldering operations. A housing 11 contains a removable pre-filter 12, a removable main filter 14, a motorized fan 16, and control circuit 17. The control circuit may include a combination of electronic components, such as transistors, sensors for detecting motor speed, memory devices, programmable logic controllers, microcontrollers and/or microprocessors. Since the rotation speed of the motor and the fan are the same in this embodiment, detecting motor rotation speed allows fan rotation speed to be determined. In this embodiment, motor rotation speed is detected to determine fan rotation speed indirectly. In other embodiments, fan rotation speed is detected directly.

A control panel 18 on a front side of the housing 11 includes switches and a visual display which allow a user to operate and maintain the proper function of the air cleaner assembly 10. A hinged lid 20 forming the top of the housing 11 can be pivoted open by the user by unlocking a latch 22. Opening the lid 20 allows the user to access the pre-filter 12 and the main filter 14 for replacement.

The pre-filter 12 is located upstream of the main filter 14 so as to keep relatively large airborne particles from getting into the main filter. This can lengthen the useful life of the main filter. The pre-filter can be made of polymer or glass fibers. Over time, the pre-filter 12 becomes clogged, which results in reduced air flow. As the pre-filter 12 becomes increasing clogged, the motor operates at a greater rotation rate. An increase in motor speed occurs naturally when less air mass moves downstream from the filters 12, 14 to the fan 16. As will be explained below, the control circuit 17 is configured to detect and/or estimate when the pre-filter 12 is overly clogged and to provide a signal to the user when the pre-filter should be replaced.

Since air (environment) conditions can vary greatly, detection by use time is not enough to detect filter clogging, and the revolutions of motor is needed especially for poor environment conditions. When the air has an unusually high amount of dust and particulates, filters will clog and deteriorate sooner than a pre-determined time. Thus detection of filter clogging by a decrease in air flow is necessary. Measuring the air flow quantity and speed, as a means to detect filter clogging, requires a flow meter and a current meter. Detecting the revolutions of the motor, as a means to detect filter clogging, does not require a flow meter or a current meter, thereby reducing the number of components and the cost of the air cleaner assembly.

Figure 12:
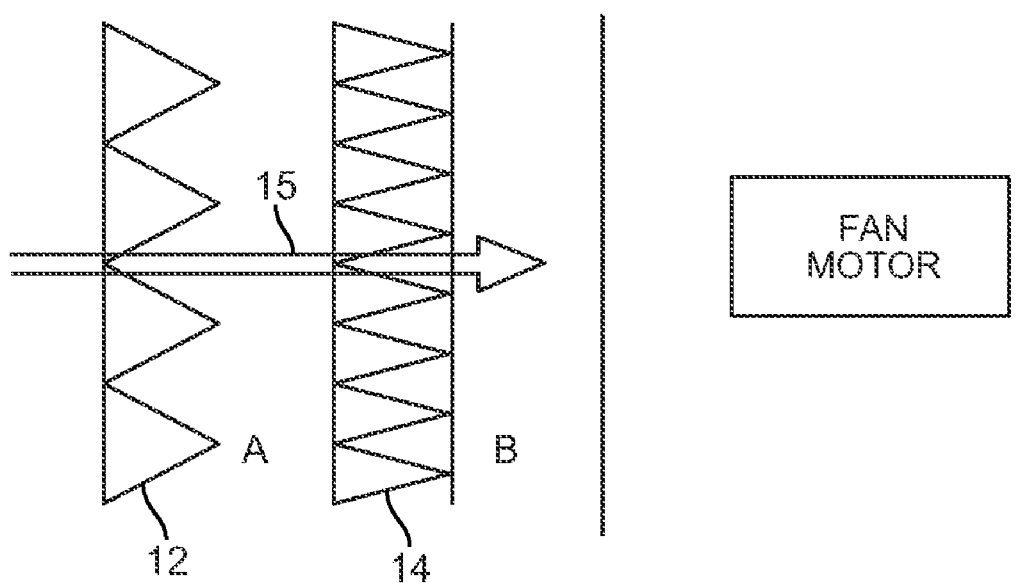
FIG. 12 is a diagram showing flow direction of an air stream through the air cleaner assembly.

Displaying a warning about the useful life of two different filters arranged sequentially is impossible to perform individually for each filter with the use of conventional technology relying solely on motor revolutions. The number of revolutions of the motor increases when either the pre-filter or main filter is clogged. Because the motor is located downstream from both the pre-filter and the main filter, it is impossible in the long run to detect, based solely on motor revolutions, which filter is clogged or deteriorated. At early stages of use, it can be assumed that a increased number of motor revolutions is due to deterioration of the pre-filter only. As time passes, this assumption cannot be made, making it impossible to detect, solely by means of motor revolutions, which filter is deteriorated and to indicate individual warnings for each filter. The same problem arises with measuring the quantity of air flow to detect filter clogging and deterioration. Referring to FIG. 12, when only the pre-filter 12 is clogged or only the main filter 14 is clogged, the air flow is the same at point "A" downstream of the pre-filter, at point "B" downstream of the main filter, and at any other point in the airstream 15 within the air cleaner assembly. Thus, it is impossible to distinguish which filter is clogged solely by measuring air flow or motor revolutions.

In preferred embodiments, the main filter 14 is a high performance filter which traps at least 98% of particles sized 0.3 μm. In use, the main filter 14 is combined with the pre-filter 12 which has a lower absorption capacity than the main filter. The inventors found through their experiments that the useful life of the main filter expires according to the detected number of clogging and end-of-useful life occurrences ("N" and "M") after weighting with a correction factor ("C"). The letter N is the detected number of clogging of the pre-filter according to motor revolutions. The letter M is the detected number of end-of-useful life occurrences according to a cumulative operating time of the pre-filter. The main filter is detected to have expired or deteriorated when N+(C×M) exceeds a limit $Z_L$ as will be explained below.

The main filter 14 traps relatively fine airborne particles as compared to the pre-filter 12. The main filter can be a high efficiency particulate air (HEPA) filter having a mat of randomly arranged fibers which trap particles by interception, impaction, and sedimentation (Brownian movement of particles). The mechanisms of interception, impaction, and sedimentation are known in the art and need not be discussed herein. The main filter can also trap particles by static attraction due to a difference in electric potential between particles and filter fibers. Over time, the main filter 14 becomes saturated and the trapping effectiveness of the main filter deteriorates as more and more particles are able to pass through. Under normal condition of use, the size of the particles trapped in the main filter is smaller than the diameter of fiber at the time of saturation. Deterioration of the particle trapping capability of the main filter 14 does not necessary result in reduced air flow. As will be explained below, the control circuit 17 is configured to estimate when the trapping capability of the main filter 14 has unduly deteriorated and to provide a signal to the user that the main filter should be replaced.

In some embodiments the pre-filter 12, when new, traps about 65% of airborne particles of 0.3 μm in size or larger, and the main filter 14, when new, traps at least 98% of airborne particles of 0.3 μm in size.

An air inlet 24 is formed through the hinged lid 20. A suction duct 26 can be connected to the air inlet 24 so that fumes 28 can be suctioned away from a remote location. When the fan 16 is operated, air is drawn into the air inlet 24. Once inside the housing 11, the air passes through the pre-filter 12 which is located above the main filter 14. After the pre-filter 12, the air passes downstream through the main filter 14 which is located above a separation wall 30.

As shown in FIG. 3, the separation wall 30 has a hole into which the air passing through the main filter 14 is drawn by the fan 16. The separation wall 30 divides the interior space of the housing 11 into a top chamber and a bottom chamber. The top chamber contains the pre-filter 12 and main filter 14, and the bottom chamber contains the fan 16, the motor attached to the fan 16, and the control circuit 17.

A main filter reset switch 32 is mounted on the separation wall 30. The main filter reset switch 32 is a pushbutton-type switch having a spring-loaded button which protrudes out from the separation wall 30 and into the space normally occupied by the main filter 14. The main filter reset switch 32 has an IN position and an OUT position. The button is pushed down to the IN position by the main filter 14 when the main filter is placed in the to top chamber of the housing 11, which then allows the control circuit 17 to detect the presence of the main filter. The button springs up to the OUT position when the main filter 14 is removed from the top chamber, which then allows the control circuit 17 to detect the absence of the main filter.

Referring back to FIG. 2, air from the bottom chamber is forced out of exhaust vents 34 located beneath the bottom chamber.

Figure 4:
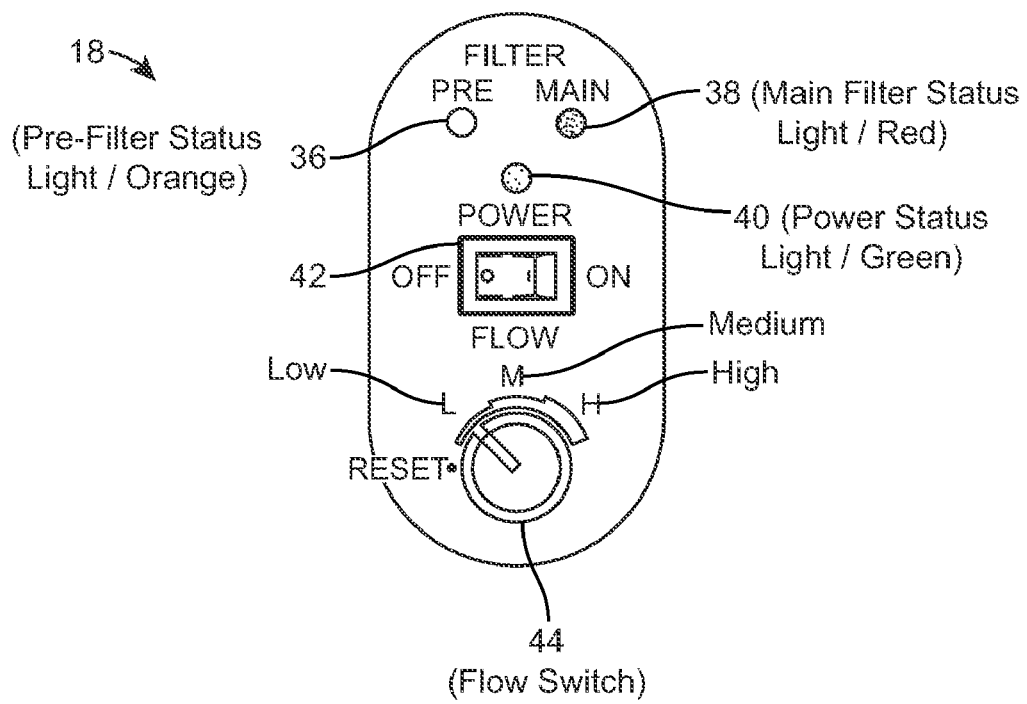
FIG. 4 is a plan view of a control panel located on the front of the air cleaner assembly of FIG. 1.

Referring now to FIG. 4, the control panel 18 includes three indicator lights, a rocker-type power switch 42 for turning the air cleaner assembly on and off, and a rotary-type flow switch 44 to allow the user to select the air flow rate for suction. The indicator lights can be light emitting diodes, an incandescent lamp, or other conventional visual indicator. The first indicator light, referred to as a pre-filter status light 36, illuminates when it is detected by control circuit 17 that the pre-filter 12 should be replaced. The second indicator light, referred to as a main filter status light 38, illuminates when it is detected by the control circuit 17 that the main filter 14 should be replaced. The third indicator light, referred to as a power status light 40, illuminates when the power switch 42 is moved from the OFF position to the ON position. The flow switch 44 is movable to and from three different flow positions and a RESET position, and has an electrical terminal for each of the four positions. At the high flow position, the air cleaner assembly 10 provides the highest level of suction among the three flow settings. At the medium flow position, the air cleaner assembly 10 provides an intermediate level. At the low flow position, the air cleaner assembly 10 provides the lowest level of suction among the three flow settings.

When flow switch 44 is at the RESET position, the control circuit 17 stops the fan 16 to allow the user replace pre-filter 12. When the user moves the flow switch 44 to the RESET position, the control circuit 17 detects that the pre-filter 12 has been replaced and, as explained below, resets parameters associated with detecting clogging of the pre-filter. The flow switch having the RESET position can be referred to as a pre-filter reset switch.

Figure 5:
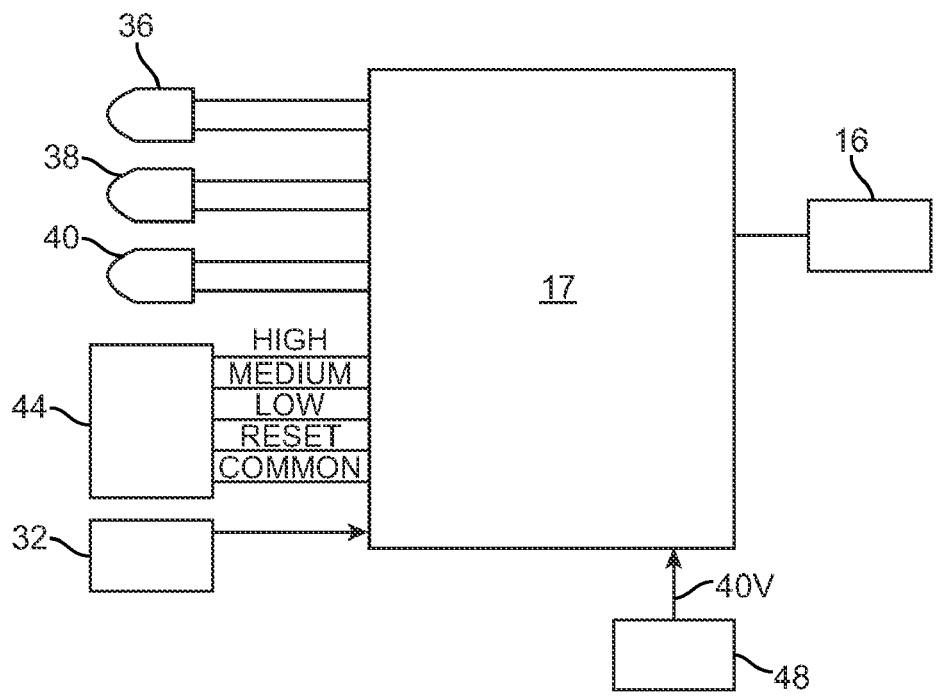
FIG. 5 is block diagram showing indicators and switches on the control panel of FIG. 4 connected to a control circuit of the air cleaner assembly.

As shown in FIG. 5, the control circuit 17 is operatively connected to and controls the three indicator lights 36, 38, 40 on the control panel 18. The control circuit 17 is also operatively connected to the flow switch 44, the main filter reset switch 32, a motor 46 that rotates the fan 16, and a power supply printed circuit board 48 that provides 40 volts to the control circuit 17.

In some embodiments, air flow rate for suction at the various flow switch 44 settings are shown in TABLE 1.

TABLE 1

| Flow Switch Position (flow setting) | Air Flow Rate, m³/min | Motor speed, rpm | | |
|---|---|---|---|---|
| | | Pre-filter New (normal speed without clogging) | Rotation Rate Limit for 1st Warning to Replace Pre-filter ($S_{L1}$) | Rotation Rate Limit for 2nd Warning to Replace Pre-filter ($S_{L2}$) |
| Low | 2.8 | 3400 | 3710 | 3800 |
| Medium | 3.7 | 4350 | 4750 | 4950 |
| High | 4.7 | 5050 | 5450 | 5700 |

Over time, it becomes more difficult to pass air through the air cleaner due to clogging. As less air mass passes downstream from the pre-filter and main filter to the fan, the speed (i.e., rotation rate) increases. The increase in motor speed occurs naturally, possibly due to a decrease in air load on the fan, and the control circuit 17 does not actively decrease the motor speed in response to the decreased air flow. Thus, the control circuit 17 only needs to detect motor speed to detect clogging. The control circuit does not need to have any sensors for directly measuring air flow rate to detect clogging.

For some embodiments, TABLE 1 shows the various speeds at which the control circuit 17 operates the fan 16. When the pre-filter 12 is new and no clogging has occurred, the fan 16 is operated at or about the motor speed values under the "Pre-filter New" column.

To detect when the user should replace the pre-filter 12, the control circuit 17 monitors two parameters: the motor speed ("S"), and fan operation time ("$T_P$") elapsed since the previous replacement of the pre-filter 12. The control circuit 17 compares these two parameters against limit values so as to detect any of two pre-filter replacement conditions. The first pre-filter replacement condition corresponds to detection of clogging based on S. The second pre-filter replacement condition corresponds to an estimate of end of useful life based on $T_P$.

To detect when the user should replace the main filter 14, the control circuit 17 counts the number of times the pre-filter 12 has been detected to have clogged due to motor speed ("S") and fan operation time ("$T_P$"). The control circuit 17 keeps track of three parameters: the number of times ("N") the pre-filter is detected to have clogged due to the first pre-filter replacement condition; the number of times ("M") the pre-filter is detected to have deteriorated due to the second pre-filter replacement condition; and the fan operation time ("$T_M$") elapsed since the previous replacement of the main filter. The control circuit 17 calculates a parameter ("Z") as a function of N and M, and compares Z and $T_M$ against limit values so as to detect any of two main filter replacement conditions. The first main filter replacement condition corresponds to an estimate of end of useful life based on Z. The second main filter replacement condition corresponds to an estimate of end of useful life based on $T_M$.

Figure 6A:
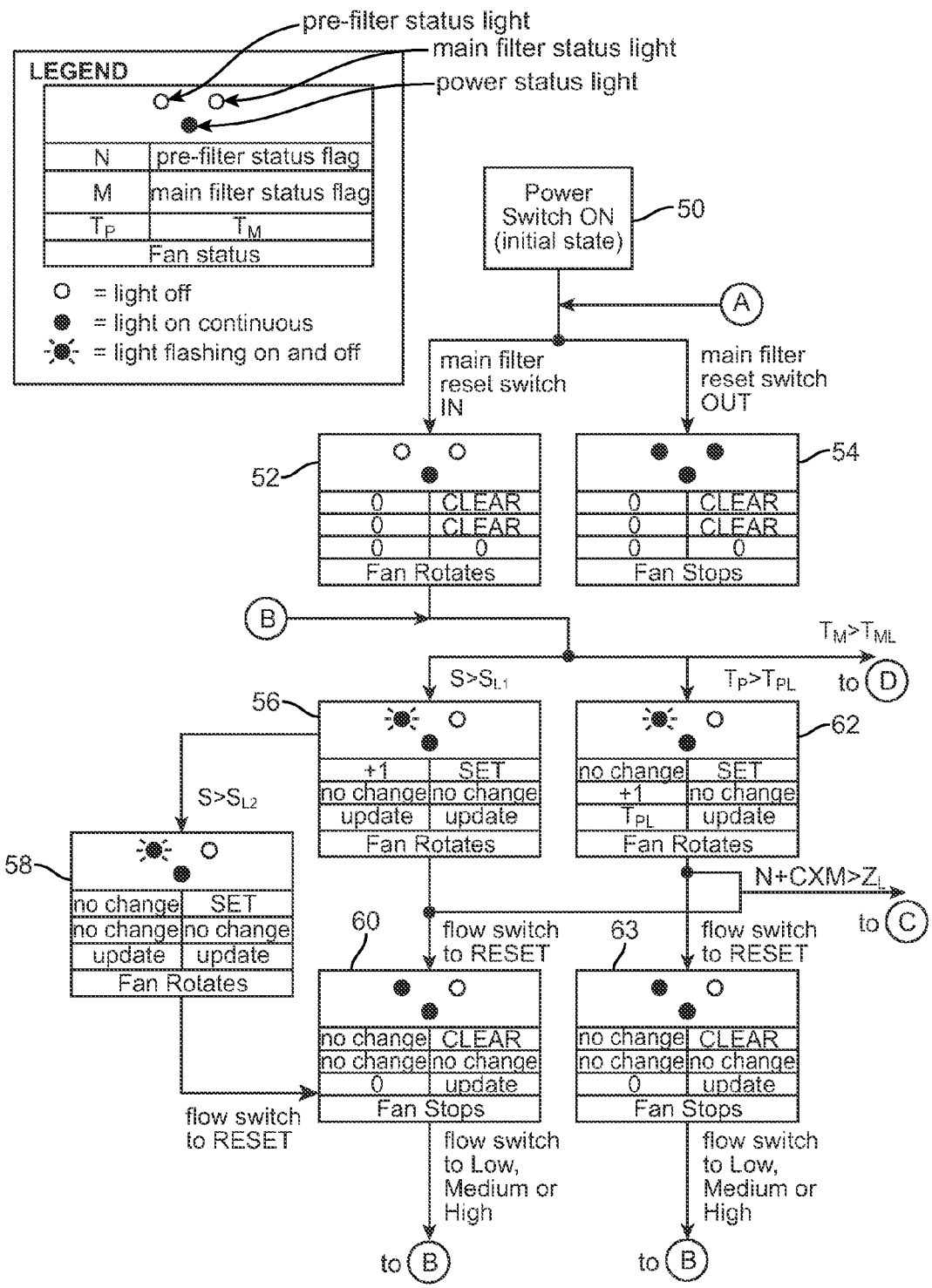
FIGS. 6A and 6B are flow diagrams showing the state of various parameters during the course of operation of the air cleaner assembly.

Operation of the air cleaner assembly 10 of some embodiments will now be described with reference to FIGS. 6A and 6B. FIG. 6A, which relates to replacing the pre-filter 12, is discussed first. At block 50, the user moves the power switch 42 (FIG. 4) from the OFF position to the ON position, which causes 40 volts to be supplied to the control circuit 17 and causes the power status light 40 to illuminate. If the main filter reset switch 32 (FIG. 3) is at the IN position, the control circuit 17 detects that the main filter 14 is present in the housing 11 and causes the motor to rotate at a speed according to the position of the flow switch 44, as shown in block 52. However, the fan 16 does not rotate when the flow switch 44 is at the RESET position. If the main filter reset switch 32 is at the OUT position, the control circuit 17 illuminates the main filter status light 38, detects that the main filter 14 is removed from the housing 11, and does not provide power to the fan 16 for rotation, as shown in block 54.

In some instances, degradation in the ability of the pre-filter 12 to trap particles is accompanied by reduced air flow through the pre-filter. Due to the reduced air flow, the fan 16 runs at a faster speed. As mentioned previously, the increase in fan speed occurs naturally, possibly due to a decrease in air load on the fan, and the control circuit 17 does not actively change the motor speed. The control circuit 17 uses the speed to indirectly detect whether there is sufficient clogging to warrant replacement of the pre-filter 12.

Still referring to FIG. 6A, the control circuit 17 detects speed and compares the speed to various rotation rate limits. As shown at block 56, when the speed ("S") exceeds a first rotate rate limit ("$S_{L1}$"), for example 3710 rpm, the control circuit 17 continues to rotate the motor but causes the pre-filter status light 36 to start flashing on and off at a relatively slow rate. Normally, the pre-filter status light 36 is not illuminated. The relatively slow flashing rate serves as a first warning signal to the user that the pre-filter 12 is clogged and should be replaced. The rate of flashing can be, for example, cycles of 500 msec illuminated followed by 500 msec not illuminated.

At block 56, the control circuit 17 increases by 1 a first counter variable ("N"), and changes a pre-filter status flag to "set," thereby indicating that the pre-filter 12 should be replaced by the user. The first counter variable and the pre-filter status flag are stored in a memory device of the control circuit 17. The memory device is part of the control circuit 17 within the housing 11 and can be an electrically erasable read-only memory (E2PROM) or other device. The incremental increase of the first counter variable ("N") allows the control circuit 17 to count the number of times that clogging has been detected to have occurred, which is then used to detect when the main filter 14 should be replaced. The pre-filter status flag can be a binary variable with one state indicating that the pre-filter 12 should be replaced, and another state indicating that the pre-filter need not be replaced.

As shown at block 58, when the motor speed ("S") exceeds a second rotation rate limit ("$S_{L2}$"), for example 3800 rpm, the control circuit 17 continues to rotate the motor but causes the pre-filter status light 36 to start flashing on and off at a relatively fast rate. The relatively fast flashing rate serves as a second warning signal to the user that the pre-filter 12 has become even more clogged and should be replaced. The rate of flashing can be, for example, cycles of 200 msec illuminated followed by 200 msec not illuminated.

The first and second rotation rate limits $S_{L1}$ and $S_{L2}$ used by the control circuit 17 depend upon the flow position of the flow switch 44. The control circuit 17 has stored within its memory device a matrix of rotation rate limits, there being a first and second rotation rate limit for each flow setting. In some embodiments, the matrix of rotation rate limits is as shown in TABLE 1.

It will be appreciated that any suitable value higher than the normal speed can be used for the first rotation rate limit $S_{L1}$, and any higher value can be used for the second rotation rate limit $S_{L2}$. Since the motor speed must be faster to achieve a higher air flow rate, suitable values for $S_{L1}$ will be progressively higher for the rotation rate limits for the low, medium and high flow settings, respectively. Similarly, suitable values for $S_{L2}$ will be progressively higher for the low, medium and high flow settings, respectively. Both $S_{L1}$ and $S_{L2}$ can be selected based in part on the size, blade shape, and construction type of the fan 16, efficiency of the fan motor, and other structural factors that affect air flow through the air cleaner assembly 10.

In some instances, degradation in the ability of the pre-filter 12 to trap particles is not accompanied by reduced air flow through the pre-filter 12. The control circuit 17 detects the cumulative time during which the same pre-filter 12 has been in use within the housing 11 with the fan 16 running. The cumulative time is referred to as the pre-filter cumulative operating time ("$T_P$"). The control circuit 17 periodically saves and/or updates $T_P$ in the memory device at regular intervals, such as every 1 minute or every 10 minutes. After the power switch 42 (FIG. 4) is turned off and on, the control circuit 17 uses the $T_P$ stored previously in memory as the basis for updating.

When, as shown in block 62 of FIG. 6A, the pre-filter cumulative operating time $T_P$ exceeds a pre-filter operating time limit ("$T_{PL}$"), the control circuit 17 continues to rotate the motor but causes the pre-filter status light 36 to start flashing on and off, which serves as a warning signal to the user that the pre-filter 12 has deteriorated due to end of useful life.

Any suitable pre-filter operating time limit $T_{PL}$ may be used. The value for the pre-filter operating time limit that is actually used can be based on the construction type, size and capacity of the pre-filter 12 and/or the environmental conditions in which the air cleaner assembly 10 is intended or expected to be operated. A pre-filter operating time limit of 200 hours is determined to be suitable for a pre-filter used for manual soldering operations and configured to trap 65% of airborne particles of 0.3 μm in size or larger.

At block 62, the control circuit 17 increases by 1 a second counter variable ("M"), and changes the pre-filter status flag to "set," indicating that the pre-filter 12 should be replaced by the user. The second counter variable and the pre-filter status flag are stored in the memory device of the control circuit 17. Incremental increase of the second counter variable ("M") allows the control circuit 17 to count the number of times that the end of useful life was detected to have occurred for the pre-filter 12, which is then used to detect when the main filter 14 should be replaced.

Because the pre-filter status flag is stored in memory, the control circuit 17 can recall, even after the power switch 42 is turned off and on, that the existing pre-filter 12 has reached a condition for replacement (either due to clogging or end of useful life) and that the pre-filter still needs to be replaced. Similarly, because the counter variables N and M are stored in memory, the control circuit 17 can keep track of the number of times the pre-filter 12 has been detected to have clogged or deteriorated even after the power switch 42 is turned off and on.

Upon seeing the flashing pre-filter status light 36, the user replaces the pre-filter 12 by moving the flow switch 44 to the RESET position, which connects the reset and common terminals of the flow switch 44. As shown in blocks 60 and 63 of FIG. 6A, the RESET position causes the control circuit 17 to cut power to the fan 16 so that the fan stops rotating, and to make the pre-filter status light 36 stay on continuously. While the fan 16 has stopped, the user can open the lid 20 to replace the existing pre-filter with a new pre-filter. The RESET position also changes the pre-filter status flag from "set" to "clear," which allows the control circuit 17 to recall that the pre-filter has been replaced by the user. The RESET position does not set to zero counter variables N and M. Both N and M remain unchanged. After installing a new pre-filter 12 over the existing main filter 14 and closing the lid 20, the user can resume air suction by moving the flow switch 44 from the RESET position to one of the three flow positions.

Figure 6B:
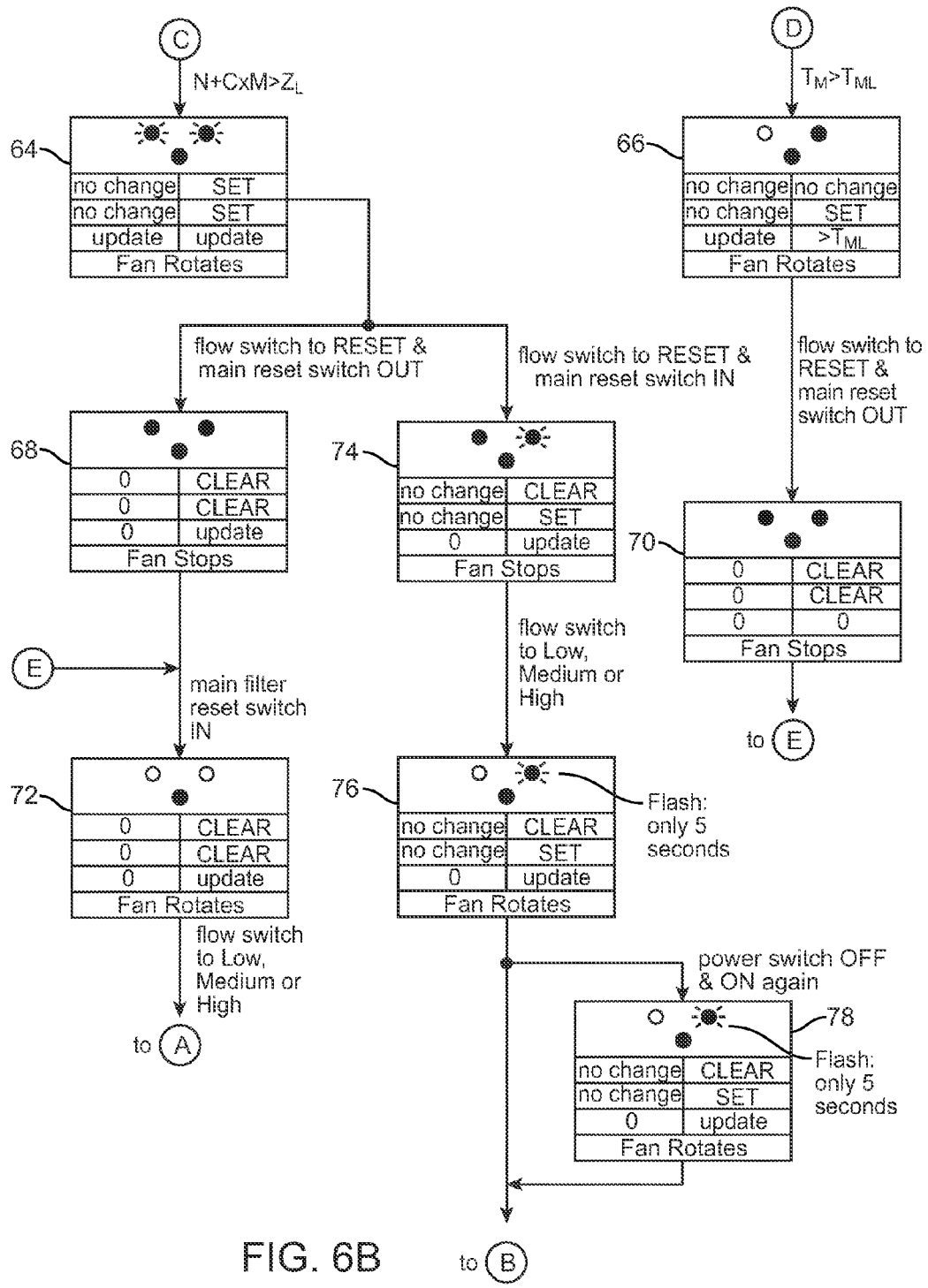

FIG. 6B, which relates to replacement of the main filter 14, will now be discussed. As indicated above, one condition for replacement of the main filter 14 is a function of counter variables N and M, which correspond to the number of times the pre-filter 12 was detected to have been clogged or deteriorated according to operating time. The control circuit 17 calculates a value Z according to the formula $Z=(N+(C\times M))$, where C is a correction factor. The control circuit 17 compares Z to a limit value, referred to as a main filter limit ("$Z_L$"), stored in the memory device of the control circuit.

As shown in block 64, a first condition for replacement of the main filter 14 occurs when Z exceeds the main filter limit $Z_L$. Under this condition, the control circuit 17 continues to rotate the fan 16 but causes both the pre-filter status light 36 and the main filter status light 38 to start flashing on and off at a relatively slow rate. The dual flashing lights serve as a warning signal to the user that the pre-filter 12 and main filter 14 should be replaced to maintain maximum air cleaning effectiveness of the air cleaner assembly 10. At block 64, the control circuit 17 changes a main filter status flag to "set," indicating that the main filter 14 should be replaced by the user. The main filter status flag can be a binary variable with one state indicating that the main filter 14 should be replaced, and another state indicating that the main filter need not be replaced. The main filter status flag is used by the control circuit 17 to recall that the main filter 14 has degraded and that the main filter still needs to be replaced even after the power switch 42 is turned off and on.

The formula $Z=(N+(C\times M))$ takes into account that the cleaning effectiveness of the existing main filter 14 depends in part upon the number of pre-filters which have been used since replacement of the previous main filter 14. Any suitable values for the correction factor C and the main filter limit $Z_L$ may be used. The value for C can be zero or non-zero. Preferably though not necessarily, C is a fraction between 0 and 1.0 so as to give greater weight to replacement of the pre-filter due to clogging compared to replacement of the pre-filter due to an operating time. The actual values for C and $Z_L$ can depend on the construction types of the pre-filter 12 and the main filter 14, the relative size and capacity of the pre-filter and the main filter, and the environmental conditions in which the air cleaner assembly 10 is intended or expected to be operated.

A soldering area may have many soldering work operations, which means there is more smoke in the air, or few work operations, which means there is less smoke in the air. Consider an example where detection according to motor revolutions has occurred eight times (C=8) and the main filter is deemed to have deteriorated when (N+(C×M)) reaches ten. Without the correction factor (C=0), when detection according to operating time of the pre-filter has occurred twice (M=2), the life detection warning for the main filter is displayed (since the sum of N and M reached ten) even when, in reality, the main filter can continue to be used and need not be replaced. The inventors found that a correction factor C=0.5 is appropriate for typical soldering environments. Continuing the example, using C=0.5 means that detection according to operating time of the pre-filter can occur four times (M=4) before the life detection warning for the main filter is displayed.

In some situations, degradation in the ability of the main filter 14 to trap particles is not accurately predicted by the number of times the control circuit has detected replacement of the pre-filter with the user moving the flow switch to the RESET position. For example, the user may have replaced the pre-filter 12 before the control circuit 17 indicated the need for replacement. Also, the user may have excessively delayed replacement of the pre-filter 12. To take these and other situations into account, the control circuit 17 monitors for a second condition for replacement of the main filter 14, that condition being based on fan operation time.

The control circuit 17 detects the cumulative time during which the same main filter 14 has been in use within the housing 11 with the fan 16 running. The cumulative time is referred to as the main filter cumulative operating time ("$T_M$"). The control circuit 17 periodically saves and/or updates $T_M$ in the memory device at regular intervals, such as every 1 minute or every 10 minutes. After the power switch 42 is turned off and on, the control circuit 17 uses the $T_M$ stored previously in memory as the basis for updating.

When, as shown in block 66 of FIG. 6B, the main filter cumulative operating time $T_M$ exceeds a main filter operating time limit ("$T_{ML}$"), the control circuit 17 continues to rotate the fan 16 but causes the main filter status light 38 to illuminate continuously. Continuous illumination serves as a warning signal to the user that the main filter 14 should be replaced to maintain maximum air cleaning effectiveness of the air cleaner assembly 10.

Any suitable main filter operating time limit may be used. The main filter operating time limit $T_{ML}$ that is actually used can be based on the construction type, size and capacity of the main filter 14 and/or the environmental conditions in which the air cleaner assembly 10 is intended or expected to be operated. A main filter operating time limit of 2500 hours was determined by the inventors to be suitable for a main filter used for manual soldering operations and configured to trap at least 98% of airborne particles of 0.3 µm in size.

After seeing the main filter status light 38 illuminated (block 66) or flashing (block 64), the user may replace the main filter 14 by moving the flow switch 44 to the RESET position, which connects the reset and common terminals of the flow switch 44. As shown in blocks 68, 70 and 74, the RESET position causes the pre-filter status light 36 to illuminate continuously and cuts power to the fan 16 so that the fan stops rotating. Also, the pre-filter operating time $T_P$ is set to zero. While the fan 16 has stopped, the user can open the lid 20 to replace any of the filters. When, as shown in blocks 68 and 70, the user replaces the main filter 14 and causes the main filter reset switch 32 to actuate, the main filter operating time $T_M$ is set to zero and the main filter status flag is changed from "set" to "clear."

After block 64, there is the possibility that the user replaces or does not replace the existing main filter 14. Removal of the existing main filter 14 allows the main filter reset switch 32 to move to the OUT position and causes the main filter status light 38 illuminate continuously. If the OUT position is maintained for at least 3 seconds, or other predetermined minimum time, the control circuit 17 detects that the main filter 14 has been replaced. When this occurs, as shown in block 68, the control circuit 17 changes the main filter status flag from "set" to "clear" and changes the main filter operating time $T_M$ and counter variables N and M to zero.

Blocks 68 and 70 continue to block 72. As shown in block 72, after replacement of the pre-filter 12 and the main filter 14, the main filter reset switch 32 moves to the IN position, then the control circuit 17 detects that a new main filter 14 has been installed and makes the main filter status light 38 turn off. The user can resume air suction by moving the flow switch 44 from the RESET position to one of the three flow positions.

After block 64, the user may move the flow switch 44 to RESET position, then replace the pre-filter 12 but fail to replace the main filter 14. When this occurs, as shown in block 74, the pre-filter status light 36 changes from flashing to steady illumination and but the main filter status light 38 continues to flash. As shown in block 76, after moving the flow switch 44 to one of the three flow settings (high, medium, or low), the pre-filter status light 36 turns off. The main filter status flag remains at "set" and the main filter status light 38 flashes only for 5 seconds because actuation of the main filter reset switch 32 was not detected by the control circuit 17. As shown in block 78, even after the power switch 42 is turned off and on, the main filter status light 38 flashes only for 5 seconds, which serves as a reminder to the user that the main filter 14 needs to be replaced.

As discussed below with reference to FIGS. 7 and 8, the inventors have found that for only the first ten replacements of the pre-filter 12, degradation in the particle trapping ability of the air cleaner assembly 10 corresponds to reduced air flow. A substantial shift in results occurs after replacement of the tenth pre-filter 12.

Figure 7:
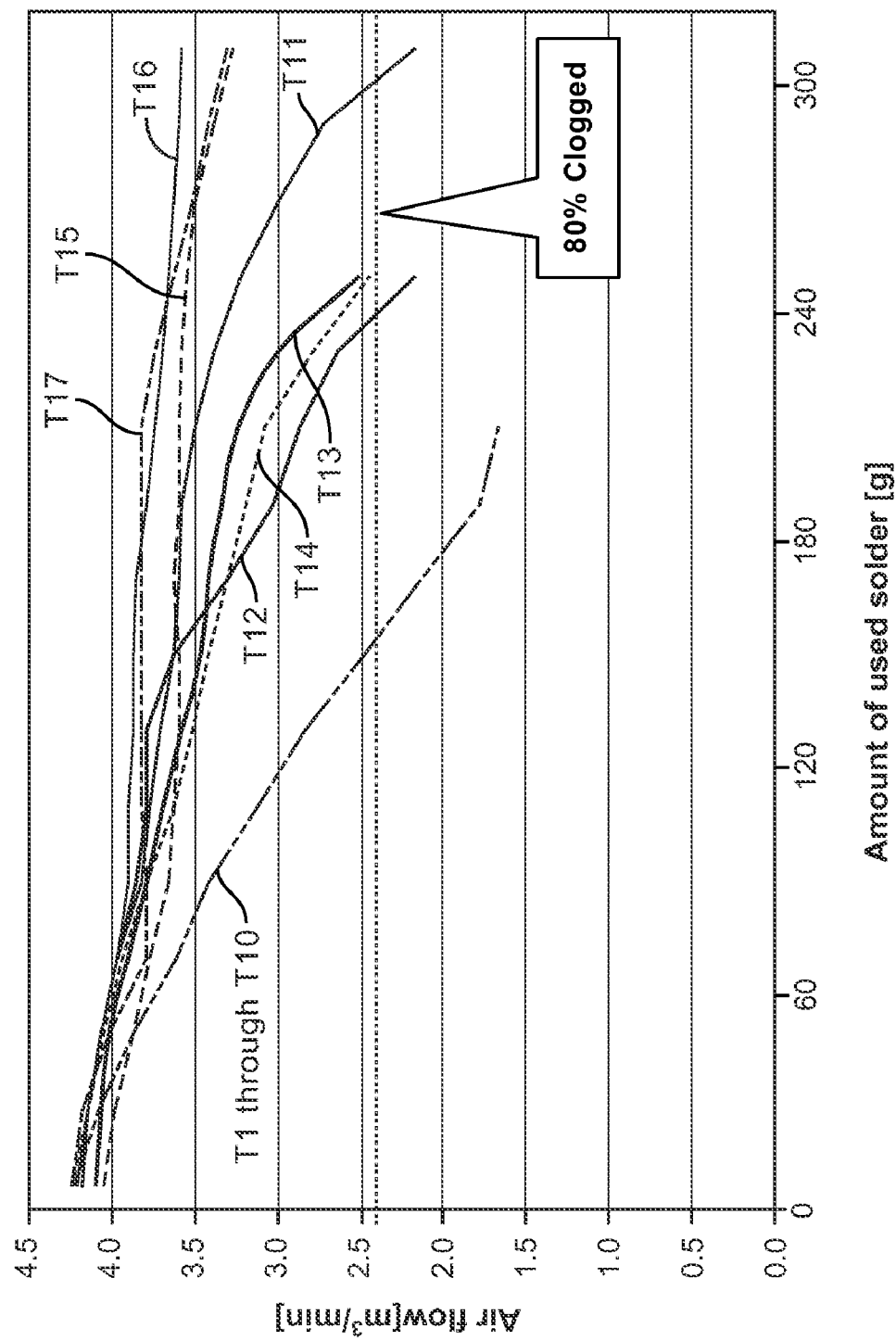
FIG. 7 is a chart of test results showing degradation in air flow through the air cleaner as smoke particles are suctioned by the air cleaner.

FIG. 7 illustrates results from a first study in which a measured amount of solder was used to create smoke and fumes that were suctioned at a constant motor speed into the air cleaner assembly 10. The lines represent a sequence of test runs using one air cleaner assembly. Each test run is designated by the letter "T" followed by a number indicating the sequential order of the test run. Each test run started with a newly installed pre-filter 12, but the main filter 14 was not replaced. The same main filter was used for all test runs. Each pre-filter was designed to trap 65% of airborne particles of 0.3 µm in size or larger when new. The main filter was designed to trap at least 98% of airborne particles of 0.3 µm in size when new.

The left-to-right downward curvature of the lines shows that the air flow rate decreased as more solder smoke and fumes were suctioned into the air cleaner assembly 10. The downward curvature was substantially the same for the first ten test runs (T1 through T10). That is, for the first ten pre-filters that were used, the air flow through the air cleaner assembly 10 (containing the pre-filter 12 and the solder filter 14) decreased at nearly the same rate as more solder smoke particles were suctioned. On the eleventh test run (T11) and thereafter (T12 through T17), the rate or slope of the downward curvature tended to decrease. That is, with each replacement of the pre-filter after T10, it took a longer amount of time (indicated by the amount of solder consumed to make smoke) for the air cleaner assembly 10 to become clogged (indicated by the decrease in air flow) even though the main filter 14 was not being replaced and was becoming less effective at trapping particles.

The longer amount of time after T10 for the air cleaner assembly 10 to become clogged (indicated by the decrease in air flow) can be explained as follows. The main filter 14 traps relatively fine airborne particles by Brownian movement of particles or static attraction due to a difference in electric potential between particles and filter fibers. Over time, the main filter 14 becomes saturated and the trapping effectiveness of the main filter deteriorates as more and more particles are able to pass through. Under normal condition of use, the size of the particles trapped in the main filter is smaller than the diameter of fiber at the time of saturation. This deterioration of main filter affects the time to decrease in air flow.

Figure 8:
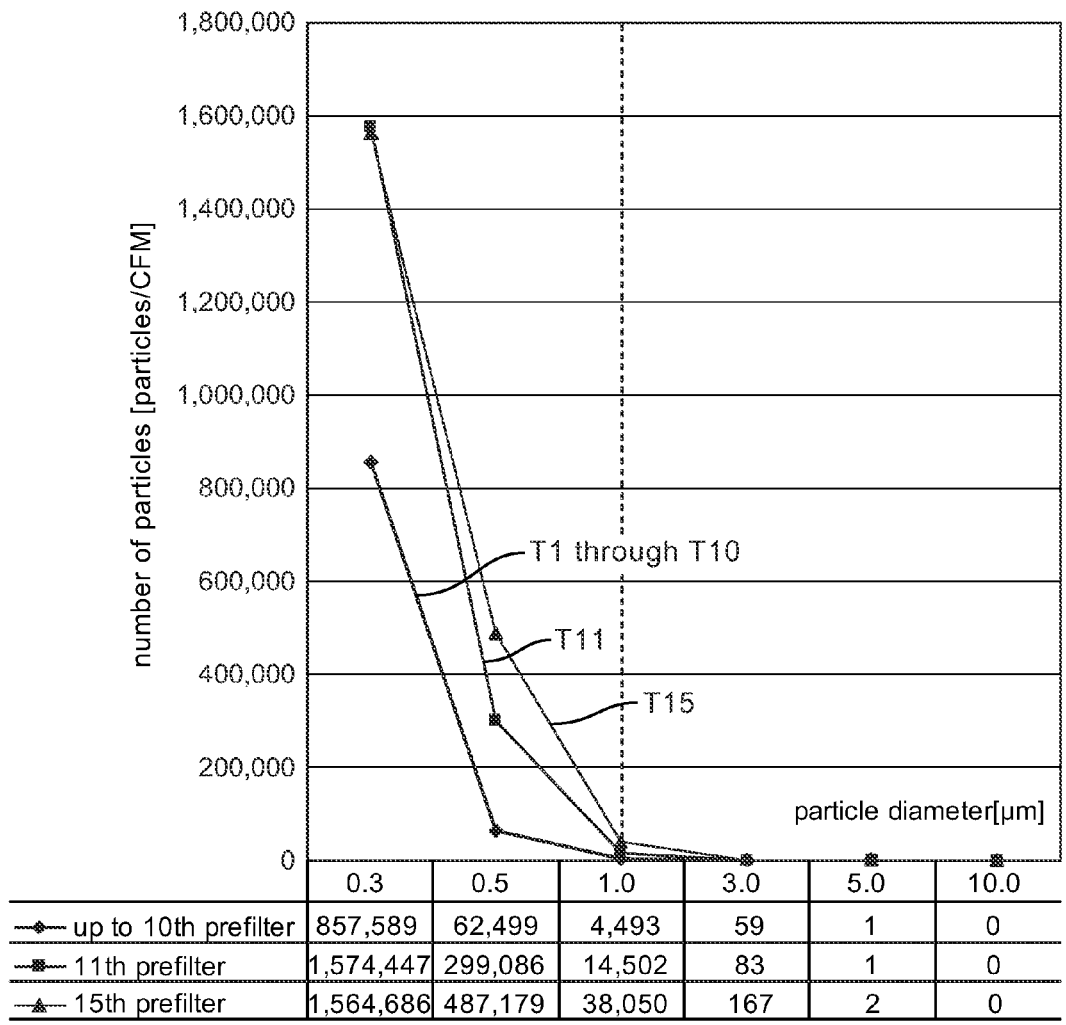
FIG. 8 is a chart of test results showing degradation in the ability of the air cleaner to trap particles.

Results of a second study, shown in FIG. 8, confirms that the main filter 14 was becoming less effective at trapping particles even though, as shown in FIG. 7, the decrease in air flow rate was taking longer with each pre-filter replacement after the tenth pre-filter. In the second study, the number of particles that were able to pass through the air cleaner (un-trapped) was measured for test runs T1 through T10, T11 and T15 of the first study. As shown in FIG. 8, the number of un-trapped particles (per cubic foot of air per minute) was about the same for test runs T1 through T10. For test runs T11 and T15, the number of un-trapped particles were significantly higher than in test runs T1 through T10.

In some embodiments, the first condition for replacement of the main filter occurs when (N+(0.5×M))≧10, where the correction factor C is 0.5 and the main filter limit $Z_L$ is 10. The criteria (N+(0.5×M))≧10 was determined by the inventors to be suitable for manual soldering operations, a pre-filter configured to trap 65% of airborne particles of 0.3 µm in size or larger, a the main filter configured to traps at least 98% of airborne particles of 0.3 µm in size.

The shift in results observed in FIGS. 7 and 8 after a certain number of pre-filters was also observed with pre-filters constructed of a different material than what was used for FIGS. 7 and 8. TABLE 2 shows results of another study conducted in the same manner as FIG. 7 except pre-filters having a different (in this case, higher) filtering capability were used. The study was conducted using fourteen different-quality pre-filters, designated T1' through T14' in the first column of TABLE 2. The second column shows the amount of solder used (to make smoke that is suctioned through the air cleaner assembly) before clogging was detected for the main filter combined with the different-quality pre-filter. The third column shows the cumulative amount of solder that was used. After clogging was detected, the different-quality pre-filter was replaced, but the main filter was not replaced. TABLE 2 shows that after using a certain number of different-quality pre-filters, a greater amount of solder was needed to induce clogging. The increase in the amount of solder needed to induce clogging means that more smoke particles were passing through the main filter, which indicates deterioration of the main filter.

TABLE 2

| Different (high)-Quality Pre-Filter | Solder Used to Make Smoke (grams) | Cumulative Amount of Solder Used (grams) |
|---|---|---|
| T1' | 45 | 45 |
| T2' | 60 | 105 |
| T3' | 75 | 180 |
| T4' | 100 | 280 |
| T5' | 80 | 360 |
| T6' | 80 | 440 |
| T7' | 110 | 550 |
| T8' | 90 | 640 |
| T9' | 75 | 715 |
| T10' | 70 | 785 |
| T11' | 105 | 890 |
| T12' | 165 | 1055 |
| T13' | 170 | 1225 |
| T14' | 270 | 1495 |

TABLE 2 shows that a significant shift in results, which corresponds to deterioration of the main filter, occurred after the eleventh low-quality pre-filter T11' was replaced. As shown in column 2 of TABLE 2, the amount solder needed to induce clogging for T12' through T14' was consistently higher than that for T1' through T11'. This study shows that using the relationship (N+(C×M)) to detect deterioration of the main filter, as was previously described, is valid for various types of pre-filters in combination with the main filter.

Figure 9:
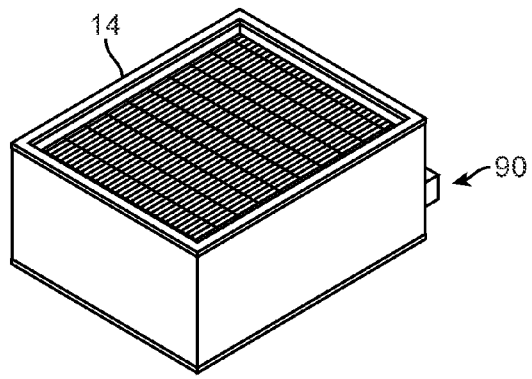
FIG. 9 is a perspective view of a main filter having a fuse which is blown by the control circuit of the air cleaner assembly.
Figure 10:
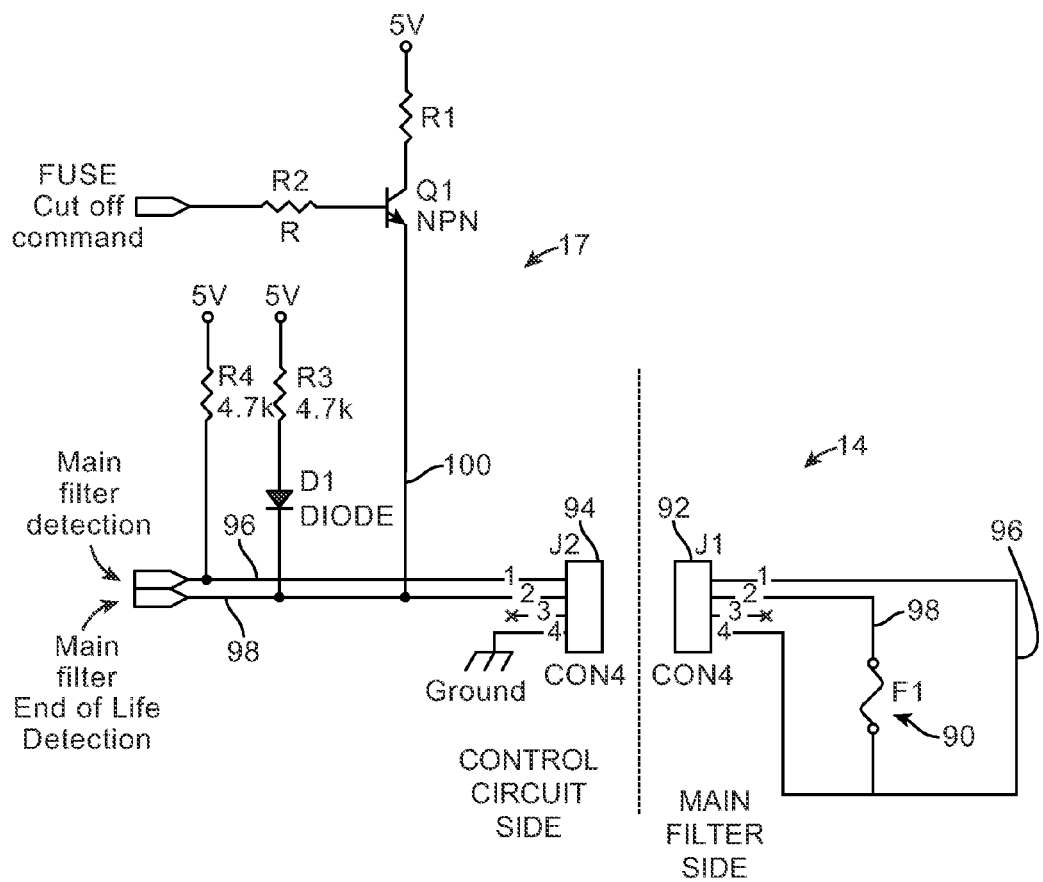
FIG. 10 is a schematic diagram showing features associated with the fuse.

In some embodiments, as shown in FIGS. 9 and 10, the main filter 14 can include a fuse 90 that allows the control circuit 17 to detect that the main filter 14 is in new condition. The fuse 90 is fixedly mounted to the main filter 14 to prevent replacement or repair of the fuse 90 after the fuse has blown. The fuse 90 is connected to an electrical connector 92 permanently mounted to the main filter 14. When the main filter 14 is installed in the housing 11, the main filter 14 electrical connector 92 mates with another electrical connector 94 that is fixedly mounted within the housing 11 and connected to the control circuit 17. Upon mating, pins (labeled 1 through 4) in the connectors 92, 94 make contact to form various electrical lines.

In FIG. 10, components illustrated in the "control circuit side" are parts of the control circuit 17, and all components illustrated in the "main filter side" are parts of the main filter 14. A first electrical line 96 has a 5-volt supply at the control circuit side. When the main filter 14 is installed in the housing 11, the 5-volt supply is grounded through connector pins 1 and 4, which results in a low signal level reading by the control circuit 17. The low signal level reading on the first electrical line 96 is used by the control circuit 17 to detect that the main filter 14 is installed in the housing 11. When the main filter 14 is removed from the housing 11, a high signal level reading on the first electrical line 96 is detected by the control circuit 17.

A second electrical line 98 has a 5-volt supply at the control circuit side. When the main filter 14 is installed in the housing 11, the second electrical line 98 passes through connector pins 2 and 4. On the main filter side, the fuse 90 is located between connector pins 2 and 4. When the main filter 14 is new, the fuse 90 is intact and has a closed state, which allows the 5-volt supply to be grounded and results in a low signal level reading on the second electrical line 98. The low signal level reading on the second electrical line 98 is used by the control circuit 17 to detect that the main filter 14 does not need to be replaced.

There is connected to the second electrical line 98 a means for blowing the fuse 90, which comprises two resistors having values R2 and R1 and a transistor having a value Q1. A "fuse cutoff" command from the control circuit 17 causes an increase in the electrical current through the fuse 90 which causes the fuse to blow and have an open state. Values for R2, R1 and Q1 can be selected to allow for a sufficient increase in current that ensures the fuse 90 blows according to the fuse cutoff command. When the fuse 90 has the open state, the 5-volt supply is no longer grounded, resulting in a high signal level reading on the second electrical line 98. The high signal level reading on the second electrical line 98 is used by the control circuit 17 to recall that the main filter 14 still needs to be replaced. The high signal level reading on the second electrical line 98 causes the control circuit 17 to change the main filter status flag to "set."

The control circuit 17 sends the fuse cutoff command, thereby blowing the fuse 90, when any of the previously described conditions for main filter replacement is detected by the control circuit 17. For example, the control circuit 17 sends the fuse cutoff command when Z=(N+(C×M)) exceeds the main filter limit $Z_L$. Optionally, the control circuit 17 also sends the fuse cutoff command when the main filter cumulative operating time $T_M$ exceeds a main filter operating time limit $T_{ML}$.

Figure 11A:
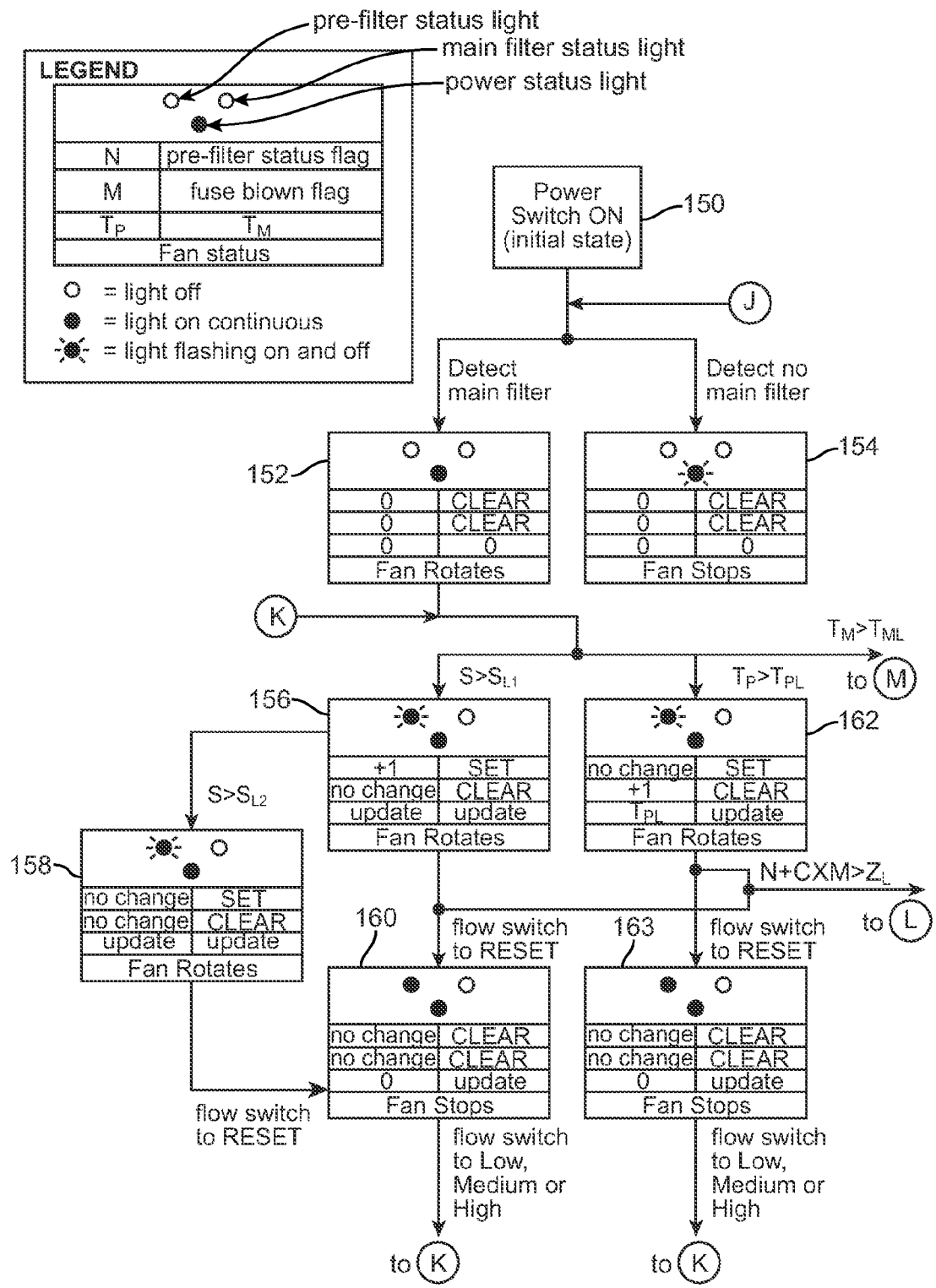
FIGS. 11A-11C are flow diagrams showing the state of various parameters during the course of operation of the air cleaner assembly when used with the main filter of FIGS. 9 and 10.

Operation of the air cleaner assembly 10 of some embodiments of the present invention will now be described with reference to FIGS. 11A-11C. FIG. 11A, which relates to replacing the pre-filter 12, is discussed first. At block 150, the user moves the power switch 42 from the OFF position to the ON position, which causes 40 volts to be supplied to the control circuit 17 and causes the power status light 40 to illuminate. When the control circuit detects a low signal level on the first electrical line 96 (main filter 14 is installed) and a low signal level on the second electrical line 98 (fuse is intact), the control circuit 17 detects that the main filter 14 need not be replaced and causes the fan 16 to rotate at a speed according to the position of the flow switch 44, as shown in block 152. However, the fan 16 does not rotate when a high signal level is detected on the first electrical line 96 (main filter is not installed), as shown in block 154. In block 154, the control circuit 17 causes the power status light 40 to flash on and off. With the fan 16 stopped, the user may open the housing 11 to install the main filter.

Continuing from block 152, the control circuit 17 detects motor speed and compares the speed to various rotation rate limits. As shown at block 156, when the motor speed ("S") exceeds a first rotate rate limit ("$S_{L1}$"), for example 4750 rpm, the control circuit 17 continues to rotate the motor but causes the pre-filter status light 36 to start flashing on and off at a relatively slow rate. The relatively slow flashing rate serves as a first warning signal to the user that the pre-filter 12 is clogged and should be replaced.

At block 156, the control circuit 17 increases by 1 a first counter variable ("N"), and changes a pre-filter status flag to "set," indicating that the pre-filter 12 should be replaced by the user. The first counter variable and the pre-filter status flag are stored in the memory device of the control circuit 17.

As shown at block 158, when the motor speed ("S") exceeds a second rotation rate limit ("$S_{L2}$"), for example 4950 rpm, the control circuit 17 continues to rotate the fan 16 but causes the pre-filter status light 36 to start flashing on and off at a relatively fast rate. The relatively fast flashing rate serves as a second warning signal to the user that the pre-filter 12 has become even more clogged and should be replaced.

The first and second rotation rate limits $S_{L1}$ and $S_{L2}$ used by the control circuit 17 depends upon the flow position of the flow switch 44, as was discussed in connection with FIG. 6A. The control circuit 17 has stored within it a matrix of rotation rate limits, there being a first and second rotation rate limit for each flow setting. In some embodiments, the matrix of rotation rate limits is as shown in TABLE 1.

The control circuit 17 detects the cumulative time during which the same pre-filter 12 has been in use within the housing 11 with the fan 16 running. The cumulative time is referred to as the pre-filter cumulative operating time ("$T_P$"). The control circuit 17 periodically saves and/or updates $T_P$ in the memory device at regular intervals, such as every 1 minute or every 10 minutes. After the power switch 42 is turned off and on, the control circuit 17 uses the $T_P$ stored previously in memory as the basis for updating.

When, as shown in block 162 of FIG. 11A, the pre-filter cumulative operating time $T_P$ exceeds a pre-filter operating time limit ("$T_{PL}$"), the control circuit 17 continues to rotate the fan 16 but causes the pre-filter status light 36 to start flashing on and off. Any suitable pre-filter operating time limit $T_{PL}$ may be used, as was discussed in connection with FIG. 6A.

At block 162, the control circuit 17 increases by 1 a second counter variable ("M"), and changes the pre-filter status flag to "set," indicating that the pre-filter 12 should be replaced by the user.

Because the pre-filter status flag is stored in memory, the control circuit 17 can recall, even after the power switch 42 is turned off and on, that the existing pre-filter 12 has reached a condition for replacement (either due to clogging or end of useful life) and that the pre-filter 12 still needs to be replaced. Similarly, because counter variables N and M are stored in memory, the control circuit 17 can keep track of the number of times the pre-filter 12 has been detected to have clogged or deteriorated even after the power switch 42 is turned off and on.

Upon seeing the flashing pre-filter status light 36, the user replaces the pre-filter 12 by moving the flow switch 44 to the RESET position. As shown in blocks 160 and 163 of FIG. 11A, the RESET position causes the control circuit 17 to cut power to the fan 16 so that the fan 16 stops rotating, and to make the pre-filter status light 36 stay on continuously. While the fan 16 has stopped, the user can open the lid 20 to replace the existing pre-filter 12 with a new pre-filter 12. The RESET position also changes the pre-filter status flag from "set" to "clear," which allows the control circuit 17 to recall that the pre-filter 12 has been replaced by the user. The RESET position does not set to zero counter variables N and M. Both N and M remain unchanged. After installing a new pre-filter 12 over the existing main filter 14 and closing the lid 20, the user can resume air suction by moving the flow switch 44 from the RESET position to one of the three flow positions.

Figure 11B:
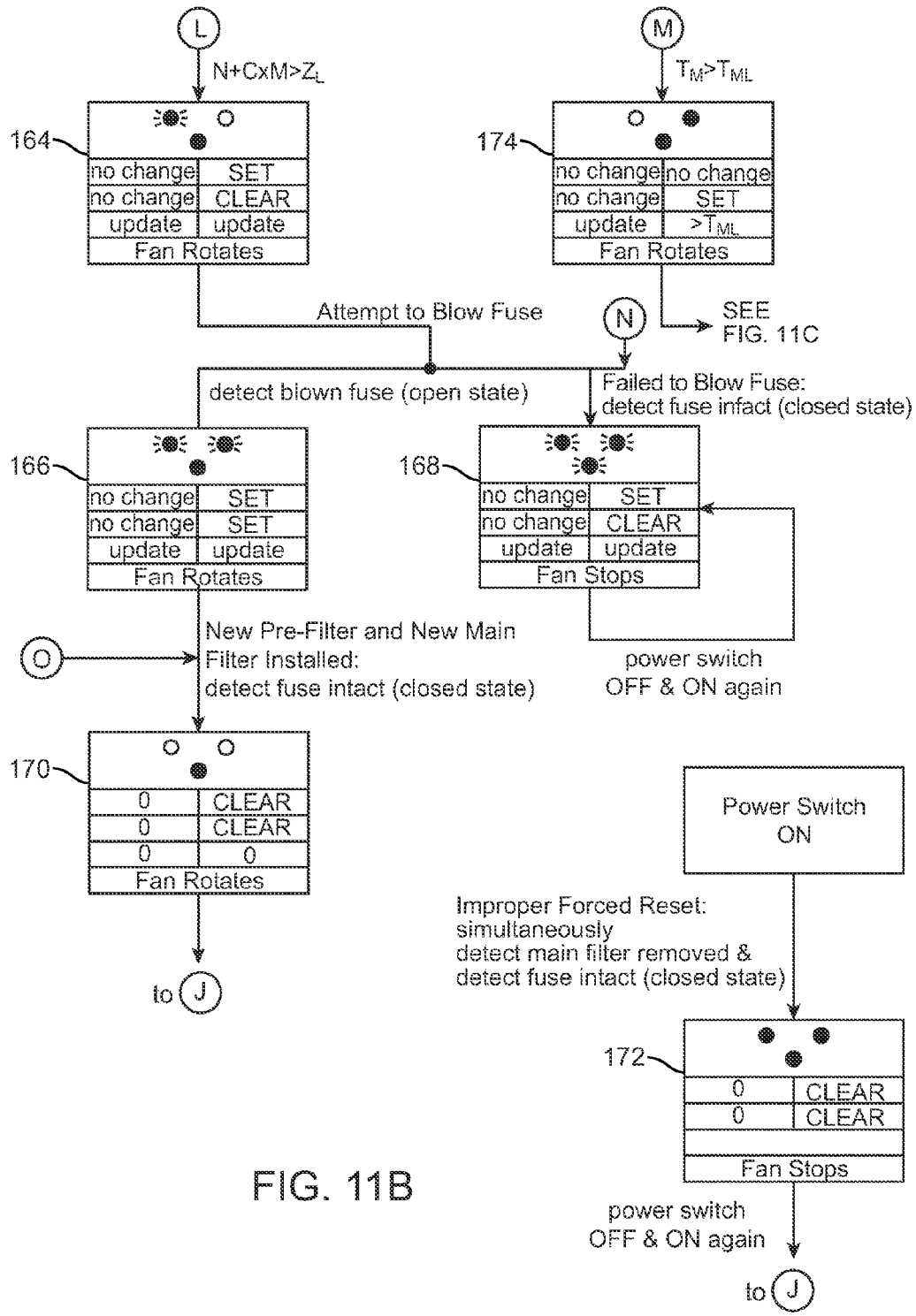
Figure 11C:
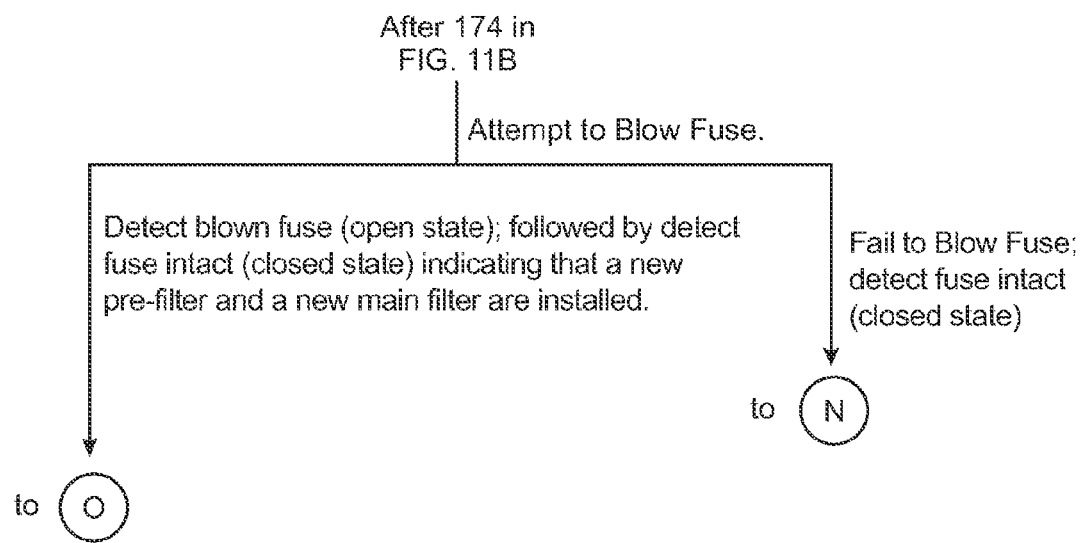

FIGS. 11B and 11C, which relate to replacement of the main filter 14, will now be discussed. As indicated above, one condition for replacement of the main filter 14 is a function of counter variables N and M, which correspond to the number of times the pre-filter 12 was detected to have clogged or deteriorated due to operating time. The control circuit 17 calculates a value Z according to the formula Z=(N+(C×M)). The control circuit 17 compares Z to a limit value, referred to as a main filter limit ("$Z_L$"), stored in the memory device of the control circuit 17. Any suitable values for C and $Z_L$ may be used, as was discussed in connection with FIG. 6B.

As shown in block 164 in FIG. 11B, a condition for replacement of the main filter 14 occurs when Z exceeds the main filter limit $Z_L$. Under this condition, the control circuit 17 continues to rotate the fan 16 but causes the pre filter status light 36 to start flashing on and off. At block 164, the control circuit 17 sends a fuse cutoff command to the first electrical line 98 (FIG. 10) in an attempt to blow the fuse 90.

When, as shown in block 166, the control circuit 17 confirms that the fuse 90 is blown by detecting a high signal level on the second electrical line 98 (FIG. 10). As a result, the control circuit 17 changes a fuse blown flag to "set."

As shown in block 168, the control circuit 17 may detect that the fuse 90 failed to blow by detecting a low level on the second electrical line 98 (FIG. 10). As a result, the control circuit 17 attempts to blow the fuse again, for a total of ten attempts. If the fuse 90 fails to blow after ten attempts, the control circuit 17 stops the fan 16, keeps the fuse blown flag as "clear," and causes all three indicator lights to flash on and off. With $Z \geq Z_L$ and there being a low signal level on the second electrical line 98 (fuse not blown), the control circuit 17 keeps the fan 16 stopped even after the power switch 42 is turned off and on again. The fan is stopped because the user may have installed a non-genuine main filter or attempted to bypass the blown fuse of the main filter 14 by installing a jumper wire on the blown fuse 90 (FIG. 10), or because the control circuit failed to blow the fuse.

Still referring to FIG. 11B and continuing from block 166, the user may install a new pre-filter 12 and new main filter 14 in the housing 11. The new main filter 14 will have a fuse that is intact. Consequently, as shown in block 170, the control circuit 17 detects a low signal level on the second electrical line 98 (FIG. 10). This causes the control circuit 17 to set both counter variables N and M to zero, to set the pre-filter cumulative operating time $T_P$ to zero, and to change both the pre-filter status flag and the fuse blown flag to "clear."

As shown in block 172, where the power is turned ON, a forced reset condition occurs if the control circuit 17 could simultaneously detect a high signal level on the first electrical line 96 (corresponding to absence of main filter) and a low signal level on the second electrical line 98 (corresponding to the presence of intact fuse). Since the absence of the main filter 14 and the presence of an intact fuse are inconsistent with each other, the control circuit stops the fan 16 and resets all parameters to either zero or clear.

When, as shown in block 174 of FIG. 11B, the main filter cumulative operating time $T_M$ exceeds a main filter operating time limit ("$T_{ML}$"), the control circuit 17 continues to rotate the fan 16. The control circuit 17 also tries to blow the fuse 90 similarly to the driving state of block 164. As shown in FIGS. 11B and 11C, the driving state proceeds from block 174 to block 170 if the fuse is successfully blown and the main filter is replaced, or to block 168 if the control circuit 17 failed to blow the fuse.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. For example, embodiments of the present invention include combined use of the main filter reset switch 32 and a main filter having a fuse 90. Accordingly, it is not intended that the invention be limited, except as by the appended claims.

What is claimed is:

1. An air cleaner assembly comprising:
   a housing;
   a fan configured to draw air into the housing when the fan is operated;
   a pre-filter in the housing and configured to trap particles in the air drawn into the housing;
   a main filter in the housing and disposed downstream of the pre-filter;
   a display comprising an indicator; and
   a control circuit configured to control the indicator to indicate that the pre-filter should be replaced and to indicate the main filter should be replaced, individually,
   wherein the control circuit is configured to detect the clogging of the pre-filter, count a number ("N") of times that clogging of the pre-filter has been detected, count a number ("M") of times that end of useful life of the pre-filter has been detected, and control the indicator to indicate that the main filter should be replaced when Z exceeds a main filter limit, wherein Z=(N+(C×M)) and C is a correction factor.

2. The assembly of claim 1, wherein the control circuit is configured to control the indicator to indicate that the pre-filter should be replaced when clogging of the pre-filter has occurred or when the end of useful life of the pre-filter has occurred, and the control circuit is configured to control the indicator to indicate that the main filter should be replaced when a number of times satisfy pre-determined conditioned number that clogging of the pre-filter has been detected and when end of useful life of the pre-filter has been detected.

3. The assembly of claim 1, wherein the control circuit is configured to detect rotation rate ("R") of a motor when driving the fan, detect the clogging of the pre-filter has occurred when R exceeds a rotation rate limit, and to control the indicator to indicate that the pre-filter should be replaced.

4. The assembly of claim 1, wherein the control circuit is configured to track a cumulative operating time ("T") during which the fan has operated, detect that end of useful life of the pre-filter has occurred when T exceeds a pre-filter operating time limit, and to control the indicator to indicate that the pre-filter should be replaced when T exceeds the pre-filter operating time limit.

5. The assembly of claim 4, further comprising a pre-filter reset switch configured to be actuated by a user, wherein when the pre-filter reset switch is actuated, the control circuit sets T to zero and controls the indicator to indicate that the pre-filter need not be replaced.

6. The assembly of claim 3, further comprising a pre-filter reset switch, wherein the control circuit is configured to set a pre-filter flag in memory from a first state to a second state when a first pre-filter replacement condition occurs, set the pre-filter flag in memory to the second state when a second pre-filter replacement condition occurs, set the pre-filter flag in memory to the first state when the pre-filter reset switch is actuated, detect an occurrence of the first pre-filter replacement condition when R exceeds the rotation rate limit, and detect an occurrence of the second pre-filter replacement condition occurs when a cumulative operating time ("T") of the motor exceeds a operating time limit.

7. The assembly of claim 2, wherein the control circuit is further configured to control the indicator to indicate that main filter should be replaced when a cumulative operating time exceeds a main filter operating time limit.

8. The assembly of claim 1, wherein the control circuit is further configured to control the indicator to indicate that main filter should be replaced when a cumulative operating time exceeds a main filter operating time limit.

9. The assembly of claim 1, further comprising a main filter reset switch configured to be actuated by the main filter when the main filter is removed from and installed into the housing.

10. The assembly of claim 9, wherein when the main filter reset switch is actuated, the control circuit controls the indicator to indicate that the main filter need not be replaced and resets a cumulative operating time of main filter.

11. The assembly of claim 9, wherein the control circuit is configured to set a main filter flag in memory from a primary state to a secondary state when Z and a cumulative operating time exceed a main filter limit, and set the main filter flag to the primary state when the main filter reset switch is actuated, and wherein C is stored in the control circuit.

12. The assembly of claim 1, wherein the pre-filter has a first absorption capacity and a first useful life, the main filter has a second absorption and a second useful life, the second absorption capacity is greater than the first absorption capacity, the second useful life is greater than the first useful life, and the main filter is located downstream of the pre-filter.

13. The assembly of claim 1, wherein the main filter comprises a fuse, and the control circuit is configured to blow the fuse when Z and a cumulative operating time exceed a main filter limit.

14. The assembly of claim 1, wherein the main filter is configured to trap at least 98% of particles sized 0.3 micrometer, and the pre-filter is configured to trap at least 65% of particles sized 0.3 micrometer, and the main filter limit is 10 and C is 0.5.

15. A method of operating an air cleaner assembly having a pre-filter and a main filter, the method comprising:
generating a main filter replacement signal, from the air cleaner to the user of the air cleaner, when $Z=(N+(C \times M))$ exceeds a limit value corresponding to an end of useful life of the main filter, wherein N is a multiple number of occurrences of when clogging of the pre-filter is detected, M is a multiple number of occurrences that a cumulative operating time exceeds a pre-filter operating time limit corresponding to an end of useful life of the pre-filter, and C is a correction factor stored in the air cleaner.

16. The method of claim 15, wherein the clogging of the pre-filter is detected when a rotation rate exceeds a rotation rate limit, the rotation rate being that of a motor driving a fan of the air cleaner assembly.

17. The method of claim 15, further comprising generating another main filter replacement signal, from the air cleaner to the user of the air cleaner, when the cumulative operating time exceeds a main filter operating time limit.

18. The method of claim 15, further comprising:
generating a pre-filter replacement signal, from the air cleaner to a user of the air cleaner, when the rotation rate of the motor exceeds the rotation rate limit; and
generating a second pre-filter replacement signal, from the air cleaner to the user of the air cleaner, when the cumulative operating time exceeds the pre-filter operating time limit.

19. The method of claim 15, further comprising:
replacing the main filter, wherein the main filter actuates a main filter reset switch on the air cleaner assembly during the replacing of the main filter, wherein the actuating of the main filter reset switch turns off the main filter replacement signal.

20. The method of claim 15, further comprising blowing a fuse on the main filter when $Z=(N+(C \times M))$ exceeds the limit value or when the cumulative operating time exceeds the main filter operating time limit.

* * * * *